United States Patent
Pulkkinen et al.

(10) Patent No.: US 9,883,134 B2
(45) Date of Patent: Jan. 30, 2018

(54) SYSTEM, A METHOD, A WEARABLE DIGITAL DEVICE AND A RECORDING DEVICE FOR REMOTE ACTIVATION OF A STORAGE OPERATION OF PICTORIAL INFORMATION

(71) Applicant: Suunto Oy, Vantaa (FI)

(72) Inventors: Ewa Pulkkinen, Vantaa (FI); Björn Bornemann, Vantaa (FI); Teemu Maikkola, Vantaa (FI); Maria Pekkarinen, Vantaa (FI); Michael Miettinen, Vantaa (FI); Mikko Tuomas Ahlström, Vantaa (FI); Erik Lindman, Vantaa (FI)

(73) Assignee: Amer Sports Digital Services Oy, Vantaa (FI)

( * ) Notice: Subject to any disclaimer, the term of this patent is extended or adjusted under 35 U.S.C. 154(b) by 16 days.

(21) Appl. No.: 14/328,763

(22) Filed: Jul. 11, 2014

(65) Prior Publication Data

US 2016/0006974 A1    Jan. 7, 2016

(51) Int. Cl.
*H04N 5/77* (2006.01)
*H04N 5/765* (2006.01)
(Continued)

(52) U.S. Cl.
CPC ............. *H04N 5/765* (2013.01); *G08C 17/02* (2013.01); *H04N 1/2112* (2013.01); *H04N 5/77* (2013.01);
(Continued)

(58) Field of Classification Search
CPC ...... G08C 17/02; H04N 1/2112; H04N 5/765; H04N 5/77; H04N 5/781
(Continued)

(56) References Cited

U.S. PATENT DOCUMENTS

| 8,214,139 B2 | 7/2012 | Yonker et al. |
| 8,613,937 B2 | 12/2013 | Boyden et al. |

(Continued)

FOREIGN PATENT DOCUMENTS

| WO | WO 213076720 A1 | 5/2013 |
| WO | WO 2013076720 A1 | 5/2013 |

OTHER PUBLICATIONS

Innovasub: DivePhone: A Promising Technology. Dive Matrix. Feb. 23, 2012.
(Continued)

*Primary Examiner* — Robert Chevalier
(74) *Attorney, Agent, or Firm* — Seppo Laine Oy

(57) ABSTRACT

The invention relates to a system, a method, a wearable digital device and a recording device for remote activation of a storage operation of pictorial information. According to the invention, it involves a first wearable digital device receiving instructions from a user and storing them as input values for a processing unit using said instructions, and a wireless signaling unit for communication with external devices over a wireless link. It also involves a second device comprising a recording apparatus adapted to be set in a mode of continuous capture of pictorial information, a memory, and a wireless signaling system for communicating with external devices over a wireless link. The processing unit in the first wearable digital device is adapted to issue commands to be sent over said wireless link to said second digital device for instructing storage of captured pictorial information in the memory of said at least one second device.

25 Claims, 3 Drawing Sheets

(51) Int. Cl.
*G08C 17/02* (2006.01)
*H04N 1/21* (2006.01)
*H04N 5/781* (2006.01)

(52) U.S. Cl.
CPC ......... *H04N 5/781* (2013.01); *G08C 2201/93* (2013.01); *H04N 2201/0096* (2013.01)

(58) Field of Classification Search
USPC ................ 386/228, 226, 231, 224, 227, 326
See application file for complete search history.

(56) References Cited

U.S. PATENT DOCUMENTS

| | | |
|---|---|---|
| 9,170,674 B2 * | 10/2015 | Forutanpour et al. .. G06F 3/014 |
| 2013/0235222 A1 | 9/2013 | Karn et al. |
| 2013/0271602 A1 | 10/2013 | Bentley et al. |
| 2013/0330054 A1 | 12/2013 | Lokshin |
| 2013/0343729 A1 | 12/2013 | Rav-Acha et al. |
| 2014/0036088 A1 | 2/2014 | Gabriel |
| 2014/0058546 A1 | 2/2014 | Vock et al. |
| 2014/0104447 A1 | 4/2014 | Woodman |
| 2015/0187206 A1 * | 7/2015 | Saurin et al. .......... G08C 17/02 340/5.61 |

OTHER PUBLICATIONS

Pebblesnap: Announcing Pebble Snap 2.1 Feb. 28, 2014.
Ray Maker: Garmin VIRB & VIRB Elite In-depth Review. DC Rainmaker. Dec. 19, 2013.

* cited by examiner

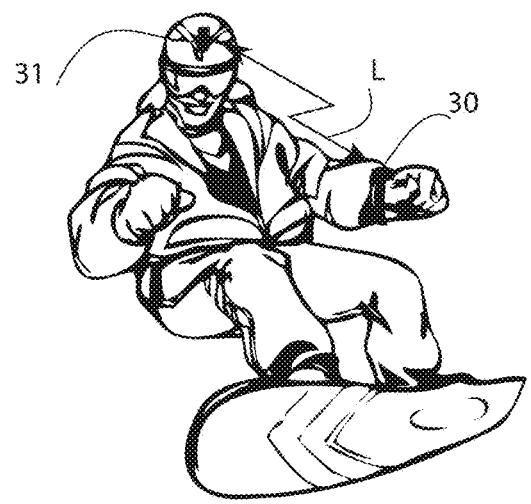
Fig. 3
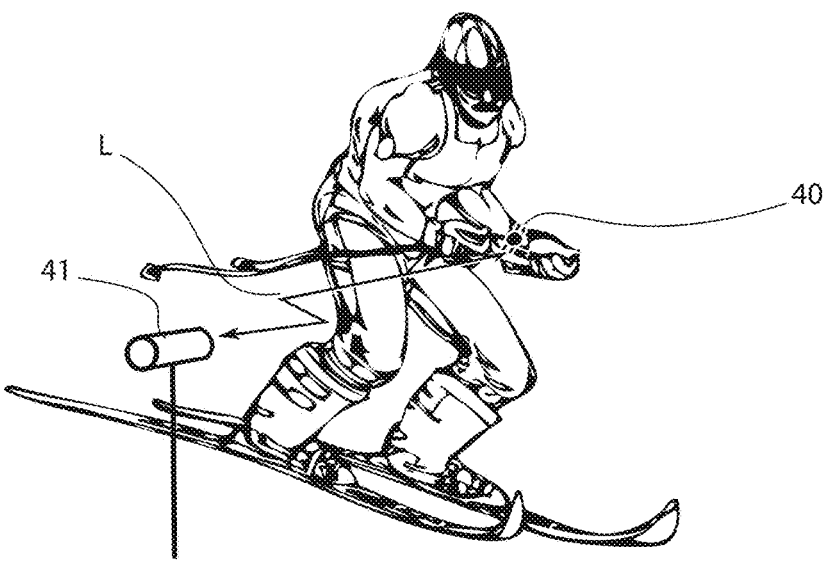
Fig. 4
| T1 | T2 | T3 | T4 | T5 | T6 |
|----|----|----|----|----|----|
| VC1 | VC2 | VC3 | VC4 | VC5 | VC6 |
Fig. 5

SYSTEM, A METHOD, A WEARABLE DIGITAL DEVICE AND A RECORDING DEVICE FOR REMOTE ACTIVATION OF A STORAGE OPERATION OF PICTORIAL INFORMATION

BACKGROUND OF THE INVENTION

Field of the Invention

The invention relates to a system and method for remote activation of a storage operation of pictorial information, a wearable digital device for remote activation of storage of pictorial information and a recording device.

More specifically, the invention relates to personal wearable and sports devices, where the user wants to capture pictorial information in form of video footage of performances and situations, and store them for later viewing, editing and sharing.

Description of Related Art

Various approaches to the problem of recording, editing, viewing and sharing of video information with personal devices are known. One such approach is presented in U.S. Pat. No. 8,613,937, where management of broadcasted and received video information with a mobile device is discussed. The content is not produced or edited by the user in any way, but filtering and bookkeeping features are offered for the content as such.

Another approach is shown in U.S. Pat. No. 8,214,139, where a navigation device may be configured to trigger various actions based on GPS positioning, an identified position change or acceleration. Such recording devices are however triggered by position data only, and the length of the footage is determined by external conditions.

Another approach is shown in US Patent Application 2013/0343729, where a system for semi-automated video editing is discussed. The system is based on an algorithm for evaluation and classification of offered video content, giving as a result a compiled and edited version of the input material where selected sequences of the original video material is included based on action, facial expressions etc.

In sports and outdoor activities, it would often be desirable to collect memories in the form of video footage during a performance or a mountain trip, for example. There is no lack of cameras to take such footage with, including the ones built-in into smartphone and PDA's. Editing such video material afterwards is time consuming and cumbersome. Also during training, it would be important for the trainee and/or the trainer to record certain sequences, perhaps taken a multitude of times, of the performance for later analysis. Long video sequences does not lend themselves easily to spot, isolate and view critical performance steps, the duration of which may be only a fraction of a second.

Thus there is a need for a system which is able to take video clips only when needed without a great deal of effort from the user and without having to hold the camera in place. It is also a requirement to keep the necessary editing at a minimum, whereby the video clips must be of a length and having a timeline around the triggering event that is known in advance, rendering them easy to scan through in order to accept or reject.

SUMMARY OF THE INVENTION

It is thus an object of the present invention to present a solution to the problems identified above, offering a solution based on two separate devices with a wireless connection between them, and on sensors connected to one or both of the devices. The inventive system, method and devices offer an efficient solution for collecting only relevant video footage around triggered events along an exercise or trip of any kind. The so collected video clips are easy to chain together to tell a "full" story, or to just browse through to select the most appropriate ones for immediate sharing over a network or for editing.

The inventive system for remote activation of a storage operation of pictorial information comprises a first wearable digital device having an interface for receiving instructions from a user and a memory unit for storing said instructions, a processing unit for running computer programs using said instructions as input values, and a wireless signaling unit for communication with external devices over a wireless link;

at least one second device comprising a recording apparatus adapted to be set in a mode of continuous capture of pictorial information, a memory, and a wireless signaling system for communicating with external devices over a wireless link.

The processing unit in the first wearable digital device is adapted to issue commands to be sent over the wireless link to the second digital device for instructing storage of captured pictorial information in the memory of the one or more second devices.

The first wearable digital device may in a first embodiment be provided with at least one sensor or a connection to at least one external sensing device and being adapted based on said sensing signals to issue commands for initiating storage of pictorial information at a second device.

The second digital device may in a second embodiment be provided with at least one sensor or a connection to at least one external sensing device and being adapted to communicate sensing signals to the first wearable digital device over the wireless link. The first wearable digital device is then adapted based on said sensing signals to issue commands for initiating storage of pictorial information at a second device.

The second digital device may in a third embodiment be provided with at least one sensor or a connection to at least one external sensing device, and being adapted to receive commands containing trigger information issued by the first wearable digital device over the wireless link, and to interpret sensing signals that match said trigger information received from the at least one sensor or external sensing device as an input signal for initiating storage of pictorial information. In this case, the first wearable digital device does not need to send storage commands in real time over the wireless link, instead the second device has been "prewarned" by the trigger information sent in advance at what event or sensor signal value to start storage.

According to a further embodiment, the first wearable digital device may include manual input means to provide said input signal to initiate storage of pictorial information and to issue storage commands to be sent over said wireless link to the second device.

In one embodiment, the first wearable digital device is a wristop computer, a smart watch, a computerized wristwatch, a personal digital assistant, or a diving computer carried on the wrist of the user. The second device may be a wearable digital camera, a smartphone equipped with a digital camera, or it may include one or several stand-alone or other digital cameras. The cameras may be built or equipped waterproof for underwater use in diving applications. The camera is in one embodiment is adapted to store captured pictorial information as video clips in its memory a predetermined period of time before and/or after having received a storage command.

An inventive wearable digital device for remote activation of storage of pictorial information being captured in a continuous manner in a remote device comprises
  an interface for receiving instructions from a user and a memory unit for storing said instructions,
  a processing unit for running computer programs using said instructions as an input, and
  a wireless signaling unit for communication with remote devices over a wireless link.

The processing unit is adapted to issue commands to be sent over the wireless link to the external digital device to instruct storage of pictorial information in the remote device.

The wearable digital device may further comprise at least one sensor or a connection to at least one external sensing device, and being adapted based on said sensing signals to issue commands to initiate storage of pictorial information at the remote device. Alternatively or additionally, the device may include manual input means for providing said input signal to initiate storage of pictorial information.

In one embodiment, the wearable digital device is a wristop computer, a smart watch, a computerized wristwatch, a personal digital assistant or a diving computer carried on the wrist of the user.

The inventive concept includes as a pair to the wearable digital device a recording device, which comprises a recording apparatus and which may be set in a mode of continuous capture of pictorial information, comprising
  at least one digital camera adapted to capture pictorial information,
  at least one memory,
  a wireless signaling system for communicating with remote devices over a wireless link.

The recording device is provided with means which in response to a command received over the wireless link from a remote digital device is adapted to activate the camera to store pictorial information in the at least one memory.

The recording device according may in an embodiment comprise at least one sensor or a connection to at least one external sensing device. It may then communicate the sensing signals to a remote digital device over the wireless link as input for a process therein adapted to issue commands regarding storage of pictorial information.

The recording device may in another embodiment comprise at least one sensor or a connection to at least one external sensing device, and being adapted to receive commands containing trigger information from the remote digital device over the wireless link. The recording device will then initiate storage of captured pictorial information when it receives sensing signals that match said trigger information from the sensing devices.

The recording device may be a wearable digital camera or a smartphone equipped with a digital camera. There may be one or several digital cameras, stand-alone or otherwise separate devices. The cameras may be made or provided waterproof for underwater use in diving applications.

The recording device may be adapted to store captured pictorial information as video clips in its memory a predetermined period of time before and/or after having received a storage command.

The inventive concept also encompasses a method of activating a storage operation of pictorial information, including the steps of:
  providing a first wearable digital device having a wireless signaling system;
  providing at least one second device having a recording apparatus adapted to be set to continuous capture of pictorial information, a memory, and a wireless signaling system;
  producing in the first wearable device commands to instruct storage of pictorial information in the second device(s);
  communicating the commands over a wireless link using the wireless signaling system to the second device(s);
  receiving the instructions in at least one second device and according to the instructions, initiating storage of captured pictorial information in a memory of the recording apparatus.

The method may in one embodiment further include the steps of:
  forming in said first wearable digital device sensor signals from at least one sensing device;
  issuing based on said sensor signals commands over said wireless link to initiate storage of pictorial information storage in said at least one second digital device.
  forming in said second device sensor signals from at least one sensing device;
  communicating said sensor signals over a wireless link using said wireless signaling system to said first wearable digital device;
  issuing in said first wearable digital device based on said sensor signals commands over said wireless link to initiate storage of pictorial information storage in said at least one second digital device.

The inventive method may in a third embodiment further include the steps of:
  issuing in said first wearable digital device commands over said wireless link containing trigger information regarding storage of pictorial information storage in said at least one second digital device;
  forming in said second device sensor signals from at least one sensing device;
  interpreting sensing signals that match said trigger information received from said at least one sensing device as said input signal for initiating storage of pictorial information.

The inventive method may include in said first wearable digital device the step of providing said input signal to initiate storage of pictorial information and to issue storage commands to be sent over said wireless link to said second digital device by using manual input means. In one embodiment, it may also include the step of storing in said at least one second device captured pictorial information as video clips of a predetermined length, wherein each clip is captured a predetermined period of time before and/or after a storage command was issued.

The invention brings considerable advantages as an efficient solution for collecting only relevant video footage around triggered events along an exercise or trip of any kind. The collected video clips are chained together and tells as such the "full" story of the event, but it is also very easy to browse through them to select the most appropriate clip(s) e.g. for immediate sharing over a network, or for editing.

With the aid of the present invention, the user need to spend less time editing footage, capture the moments he or she wants to save. The inventive concept also saves memory on memory cards typically used in digital cameras. Using pre-created or own-made applications for managing the recording of footage, the user itself can define conditions for which the recording will take place.

It is an essential feature of the present invention that the recording apparatus adapted to be in a mode of continuous capture of pictorial information. When the camera is set on, it will capture and keep a certain amount of video footage in memory where new footage erases the older, as in an endless tape recording. Only when a command is issued to initiate storage of the captured pictorial information, it will be permanently stored in the memory of the camera. This facilitates storage of video material which was captured immediately before the storage command was issued, as well as after the command. The recording period, which obviously can be set by the user and heavily depends on the nature of the event, may use all time of the period to store the video signal up to the storage command was issued, the recording period may center around the storage command, the period may start with the storage command, or any combination thereof.

For the purposes of this description and in this context, the words "recording" and "capture" are used as synonyms describing the process of recording video footage at least temporarily in a recording device that is set to be in a continuous recording mode. The word "store" and all its derivatives including "storage" are used for video footage or video clips that is actually stored permanently for later viewing, editing and/or sharing.

The wireless communication system providing wireless link may be based on radio technologies like Bluetooth or RFID, or any short-range communication system.

BRIEF DESCRIPTION OF THE DRAWINGS

FIG. 3 shows an example of the inventive system when it is carried by the user;

FIG. 4 shows an example of the inventive system where one component of the system is stationary;

FIG. 5 shows a schematic representation of video clips recorded according to the present invention;

DETAILED DESCRIPTION OF THE INVENTION

Figure 1:
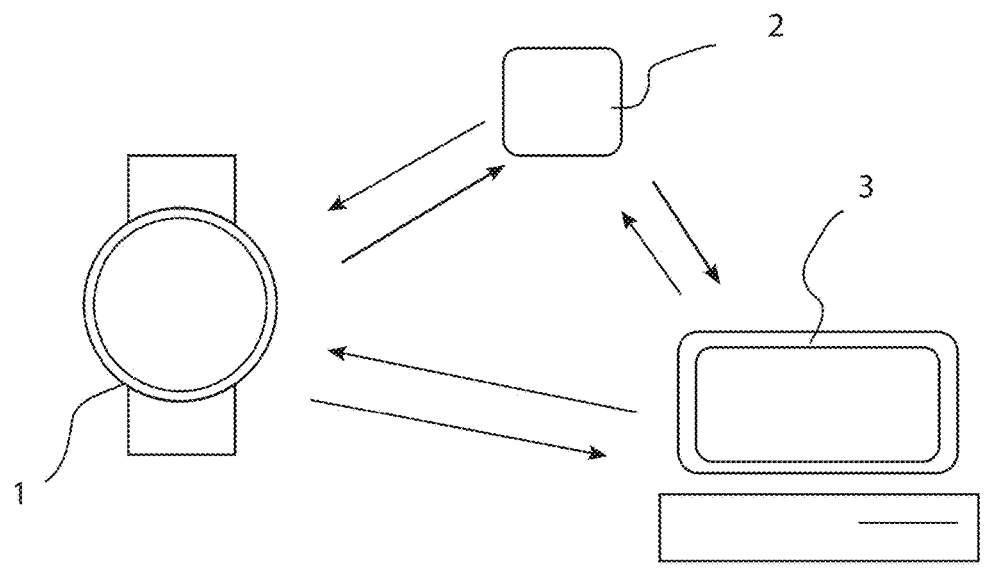
FIG. 1 shows the main components of the inventive system.

In FIG. 1 is shown the main components of the inventive system: a wristop computer 1, a unit 2 containing a video camera and a general-purpose computer 3 with a connection to an external network (not shown). If the camera unit 2 is a smartphone or tablet computer with en external (internet) network connection in itself, the computer 3 may not be necessary. Also, not all the connections between the devices need necessarily to be two-way communications. For example, in some embodiments of the invention, the wristop computer may only need to send to the camera unit 2, but not to receive anything from it.

The general-purpose computer, or a service accessed with it from the internet, may provide a programmable user interface for the wristop computer 1. Apart from obvious data selection and input needs, such as selecting display styles and colors of the display of the wristop computer 1, reading available measurement data from the wristop computer 1 into the other computer 3, and downloading various user-selected software. An important task for the user interface being operable on the computer 3 (or the camera unit 2, if so equipped), is to allow for setting or editing of parameters for the various applications running in the wristop computer. These applications depend on the sensors available to the wristop computer 1 and the needs of the user, and the parameters may typically be sensor value trigger levels for activation of the camera unit 2, video clip recording times, and so on.

It is clear that the two-way communication between the computer system 3 and the wristop computer 1 may facilitate a user interface editor system installed on the computer 3 that may be used for editing a user interface of predefined applications running in the wristop computer 1. It is also within the scope of the present invention to store the data and customized views in a format that is transferable as data files to other similar devices or social media, or to remote services e.g. on the internet for bookkeeping and further processing.

Figure 2:
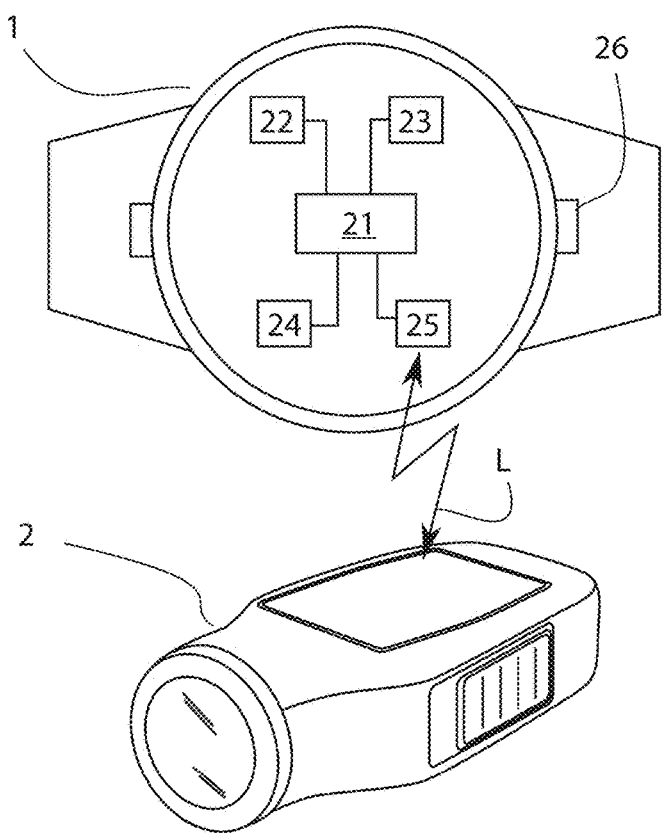
FIG. 2 shows a wristop computer and a camera unit according to the invention in more detail.

In FIG. 2 is shown the wristop computer 1 and the camera unit 2 in more detail. The wristop computer 1 has a processing unit 21 for running computer programs and applications. A user interface unit 22 receives manual commands entered by the user e.g. by push-buttons 26. A memory unit 23 is provided for storing operating systems, application program code and received instructions. A sensor interface 24 provides a wired connection to one or more built-in sensors (not shown), and/or a wired or wireless connection (see above) to external sensing devices. Typically, the sensors may be accelerometers, gyroscopes or other orientation-detecting switches, timers, GPS-devices, shock sensors, inclinometers and so forth.

A wireless signaling unit 25 is needed for communication with the camera unit 2 and/or any external computers 3 over a wireless link, as shown by the arrow L. The wireless communication protocol used for communication between computers, and/or between any remote sensors, may be a Bluetooth LE or the proprietary ANT+ protocol. These are using direct-sequence spread spectrum (DSSS) modulation techniques and an adaptive isochronous network configuration, respectively. Enabling descriptions of necessary hardware for various implementations for wireless links are available e.g. from the Texas Instrument®'s handbook "Wireless Connectivity" which includes IC circuits and related hardware configurations for protocols working in sub-1- and 2.4-GHz frequency bands, such as ANT™, Bluetooth®, Bluetooth® low energy, RFID/NFC, PurePath™ Wireless audio, ZigBee®, IEEE 802.15.4, ZigBee RF4CE, 6LoWPAN, Wi-Fi®, GPS.

In FIG. 3 is shown a man on a snowboard with a wristop computer 30 attached to his wrist and a camera 31 attached to his forehead by some suitable fastening means. Obviously, the camera may be attached to any part of the clothing, or to the snowboard. The wireless link L provides for wireless communication between the two devices 30 and 31. If so programmed, the wristop computer will send instructions to the camera 31 to start the storage of video clips when the ground speed, the vertical speed or acceleration (on a steep slope) exceeds a certain limit, or the gravity (lack of vertical acceleration) is zero or below a certain limit, indicating that the snowboarder makes a jump in the air. The trigger function may be based on any physical variable the sensors may detect, and the trigger rules may be built by an editing function to consider any combination of such variables, as will be explained later in the examples. Editors for designing and editing triggers are as such known in the art. In this context, it is also possible and within the scope of the invention to provide the camera 31 with the desired sensors, and to send in advance commands containing trigger information by the wristop computer 30 to the camera 31. During the performance, the camera 31 interprets the received sensing signals and try to match them with the trigger information. When a match occurs, storage of pictorial information is initiated.

In FIG. 4 is shown the use of the present inventive system in a downhill ski-related embodiment, where the camera 41 is stationary, and the wristop computer 40 attached to the wrist (or elsewhere) of a user is operated to activate the camera 41 via the wireless link L to store a clip when the user approaches or passes across the line-of-sight of the camera. In this way, repetitive footage can be taken e.g. for training and comparison purposes. It is clear that within the scope of the invention, any number of cameras can be placed at a distance from each other or at different angles with respect to a performance spot or along a route. The triggering of the cameras may be manual or automatic, using e.g. proximity sensing. The conditions at some spots of performance, like at a take-off ramp, easily create conditions that can make the sensors in the wristop computer 41 to trigger the camera to store the event. Other performance spots to be monitored, e.g. on board of a sailing ship, are more likely to be manually or proximity triggered.

FIG. 5 is a schematic and exemplary representation of video clips VC1 . . . VC6 stored in a semiconductor or magnetic memory. Thumbnail icons T1-T6 showing the content of each of the video clips may be looked at for immediate decision on how to deal with each of the clips. Of course, a variety of editing technologies exist and it is not in the scope of the present invention to deal with the art of managing video clips in detail.

Figure 6:
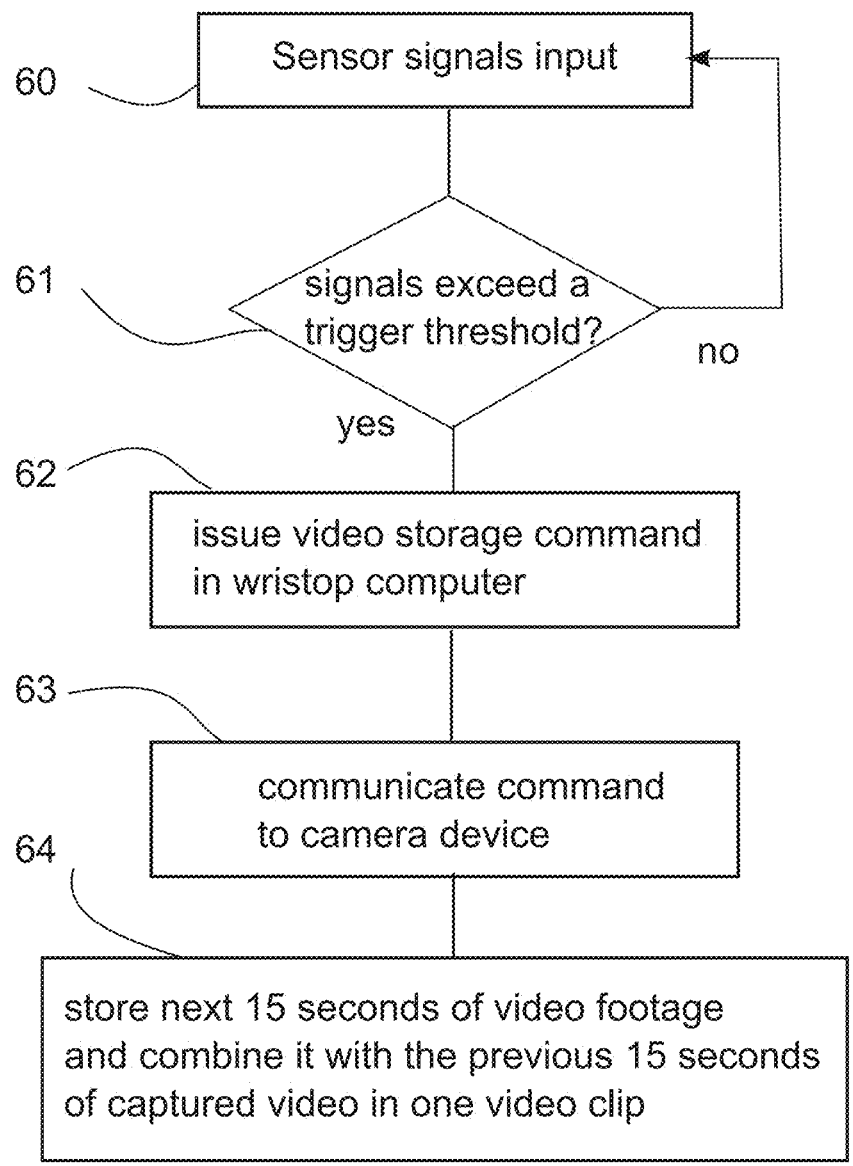
FIG. 6 shows a flowchart diagram over a video clip storage procedure according to the invention.

FIG. 6 shows a flowchart diagram over the basic video clip storage procedure according to the invention. In step 60, the wristop computer 1 of FIG. 2 is monitoring the sensor signals. If the input signals at test 61 exceed the pre-set trigger threshold for start storing video footage, a command to this effect is issued in 62 and communicated in step 63 to the camera unit 2. The camera unit in this example, records the next 15 seconds of video footage, and stores it with the previous 15 seconds of captured video in one video clip, as those shown in FIG. 5. Obviously and equally well, the whole length of the clip could be stored from video material captured before the command, and stop at the command. Vice versa, the whole length of the clip could be stored from video material captured after the command and stopped after a predetermined time.

EXAMPLES

1. Ski Stunts

The user wants to record his friend's greatest jumps/stunts. After each successful jump, when button is pressed, 30 seconds of recorded video footage preceding the pressing of the button is stored. User can pre-define the length of stored footage.

```
//if user is on moving and in free fall for longer that 2 seconds: record a
movie clip 30 sec before and 30 after.
if (SUUNTO_SPEED > 10 && SUUNTO_G[2] < 1) {
ACTIVATE.CAMERA_AFTERTHOUGHT(30);
clipsrecorded = clipsrecorded+1;
//show how many clips have been recorded
RESULT = clipsrecorded;
}
```

2. Using a Stationary and a Moving Device

Here, a user wants to get short clips without the need/possibility to manipulate the camera on the go. Proximity determination can be based on signal strength sensing, or it can be location-based using GPS. For example, the Bluetooth Low Energy (BLE) standard features proximity sensing. Other signal strength based options include ultrasound sensing e.g. in underwater applications or short-range inductive wireless (telemetric) devices. In location based proximity sensing, both the wristop computer and the camera may have GPS capabilities, or only the device on the move, provided that the position of the stationary device is fed into the GPS navigator.

Snowboarding with a helmet mounted camera, divers passing a stationary camera, sailing boats passing a turning point buoy are examples of useful applications in this regard. Filming a skateboarding trick with a camera mounted in the rail is also feasible, e.g. by using the following code:

```
//If user is approaching the camera start filming.
if(SUUNTO_PROXIMITY < 15 && recording == 0){

ACTIVATE.CAMERA_RECORD( );
    recording = 1;
//when user is gone, stop recording
}else if (SUUNTO_PROXIMITY >15 && recording == 1){
ACTIVATE.CAMERA_STOP( );
recording = 0;
}
```

3. Mountain Biking

User wants to film the downhill trails (maintaining a high speed) of a mountain bike expedition. He wants to automatically control the camera when hands can't be removed from the handlebar.

```
if (SUUNTO_SPEED > 30 && recording == 0) {
ACTIVATE.CAMERA_RECORD( );
recording = 1;
}else if (SUUNTO_SPEED < 20 && recording == 1){
ACTIVATE.CAMERA_STOP( );
recording = 0;
}
```

During such a trail, the user likely wants to record the best views, spots, jumps etc. Here the buttons of the wristop computer can be used to bookmark the spots for future editing. The bookmarks can be saved to camera memory as short clips, to allow faster editing.

It is to be understood that the embodiments of the invention disclosed are not limited to the particular systems and process steps disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. Numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for remote activation of a storage operation of pictorial information, comprising:
    a first wearable digital device having an interface for receiving instructions from a user and a memory unit for storing said instructions, a processing unit for running computer programs using said instructions as input values, and a wireless signaling unit for communication with external devices over a wireless link; and
    at least one second device comprising a recording apparatus adapted to be set in a mode of continuous capture of pictorial information, a memory, and a wireless signaling system for communicating with external devices over a wireless link;
wherein said processing unit in said first wearable digital device is adapted to issue commands containing trigger information to be sent over said wireless link to said second digital device, for instructing, in response and according to said trigger information, storage of at least part of said continuously captured pictorial information in the memory of said at least one second device, and
wherein said first wearable digital device is provided with at least one sensor or a connection to at least one external sensing device and being adapted based on said sensing signals to issue commands containing said trigger information for initiating storage of pictorial information at said least one second device.

2. A system according to claim 1, wherein said first wearable digital device includes manual input means to issue storage commands to be sent over said wireless link to said second device.

3. A system according to claim 1, wherein said first wearable digital device is a wristop computer, a smart watch, a computerized wristwatch or a personal digital assistant carried on the wrist of the user.

4. A system according to claim 1, wherein said first wearable digital device is a diving computer carried on the wrist of the user.

5. A system according to claim 1, wherein said second device is a wearable digital camera.

6. A system according to claim 1, wherein said second device is a smartphone equipped with a digital camera.

7. A system according to claim 1, wherein said second device includes one or several digital cameras.

8. A system according to claim 1, wherein said at least one second device is adapted to store captured pictorial information as video clips in its memory a predetermined period of time before and/or after having received a storage command.

9. A wearable digital device for remote activation of storage of pictorial information being captured in a continuous manner in a remote device, comprising
    an interface for receiving instructions from a user and a memory unit for storing said instructions,
    a processing unit for running computer programs using said instructions as an input,
    a wireless signaling unit for communication with remote devices over a wireless link, and
    at least one sensor or a connection to at least one external sensing device;
wherein said processing unit is adapted to, based on sensing signals from the at least one sensor or connection to at least one external sensing device issue commands containing trigger information to be sent over said wireless link to said external digital device, to instruct, in response and according to said trigger information, storage of at least part of said continuously captured pictorial information in said remote device.

10. A wearable digital device according to claim 9 for remote activation of a storage operation, further comprising manual input means for issuing storage commands comprising said trigger information to be sent over said wireless link to said remote device.

11. A wearable digital device according to claim 9, wherein the device is a wristop computer, a smart watch, a computerized wristwatch or a personal digital assistant carried on the wrist of the user.

12. A wearable digital device according to claim 9, wherein the device is a diving computer carried on the wrist of the user.

13. A recording device comprising a recording apparatus being adapted to be set in a mode of continuous capture of pictorial information, comprising
    at least one digital camera adapted to capture pictorial information,
    at least one memory,
    a wireless signaling system for communicating with remote devices over a wireless link, and
    at least one sensor or a connection to at least one external sensing device;
wherein said recording device is provided with means which, in response and according to a command containing trigger information received over said wireless link from a remote digital device, are adapted to activate said camera to store at least part of said continuously captured pictorial information in said at least one memory,
the recording device being adapted to communicate sensing signals to said remote digital device over said wireless link as input for a process therein adapted to issue commands containing said trigger information for storage of pictorial information.

14. A recording device according to claim 13, wherein said device is a wearable digital camera.

15. A recording device according to claim 13, wherein said device is a smartphone equipped with a digital camera.

16. A recording device according to claim 13, wherein said device includes one or several digital cameras.

17. A recording device according to claim 13, wherein said device is adapted to store captured pictorial information as video clips in its memory a predetermined period of time before and/or after having received a storage command.

18. A method of activating a storage operation of pictorial information, including the steps of:
   providing a first wearable digital device having a wireless signaling system;
   providing at least one second device having a recording apparatus adapted to be set to continuous capture of pictorial information, a memory, and a wireless signaling system;
   producing in said first wearable device commands containing trigger information, said commands instructing storage of pictorial information in said second device;
   communicating said commands over a wireless link using said wireless signaling system to said second device;
   receiving said commands in said at least one second device and in response and according to the instructions, initiating storage of at least a part of said continuously captured pictorial information in a memory of said recording apparatus;
   forming in said first wearable digital device sensor signals from at least one sensing device; and
   issuing based on said sensor signals commands containing said trigger information over said wireless link to initiate storage of pictorial information storage in said at least one second digital device.

19. A method according to claim 18, including in said first wearable digital device the step of providing said input signal comprising said trigger information to initiate storage of pictorial information and to issue storage commands to be sent over said wireless link to said second digital device by using manual input means.

20. A method according to claim 18, comprising the step of storing in said at least one second device captured pictorial information as video clips of a predetermined length, wherein each clip is captured a predetermined period of time before and/or after a storage command was issued.

21. A system for remote activation of a storage operation of pictorial information, comprising:
   a first wearable digital device having an interface for receiving instructions from a user and a memory unit for storing said instructions, a processing unit for running computer programs using said instructions as input values, and a wireless signaling unit for communication with external devices over a wireless link; and
   at least one second device comprising a recording apparatus adapted to be set in a mode of continuous capture of pictorial information, a memory, and a wireless signaling system for communicating with external devices over a wireless link;
   wherein said processing unit in said first wearable digital device is adapted to issue commands containing trigger information to be sent over said wireless link to said second digital device, for instructing, in response and according to said trigger information, storage of at least part of said continuously captured pictorial information in the memory of said at least one second device and
   wherein said second digital device is provided with at least one sensor or a connection to at least one external sensing device and being adapted to communicate sensing signals to said first wearable digital device over said wireless link, said first wearable digital device being adapted based on said sensing signals to issue commands containing said trigger information for initiating storage of pictorial information at said least one second device.

22. A system for remote activation of a storage operation of pictorial information, comprising:
   a first wearable digital device having an interface for receiving instructions from a user and a memory unit for storing said instructions, a processing unit for running computer programs using said instructions as input values, and a wireless signaling unit for communication with external devices over a wireless link; and
   at least one second device comprising a recording apparatus adapted to be set in a mode of continuous capture of pictorial information, a memory, and a wireless signaling system for communicating with external devices over a wireless link;
   wherein said processing unit in said first wearable digital device is adapted to issue commands containing trigger information to be sent over said wireless link to said second digital device, for instructing, in response and according to said trigger information, storage of at least part of said continuously captured pictorial information in the memory of said at least one second device, and
   wherein said second digital device is provided with at least one sensor or a connection to at least one external sensing device and being adapted to receive commands containing trigger information issued by said first wearable digital device over said wireless link and to interpret sensing signals that match said trigger information received from said at least one sensor or external sensing device as an input signal for initiating storage of pictorial information.

23. A recording device comprising a recording apparatus being adapted to be set in a mode of continuous capture of pictorial information, comprising
   at least one digital camera adapted to capture pictorial information,
   at least one memory,
   a wireless signaling system for communicating with remote devices over a wireless link, and
   at least one sensor or a connection to at least one external sensing device;
   wherein said recording device is provided with means which, in response and according to a command containing trigger information received over said wireless link from a remote digital device, are adapted to activate said camera to store at least part of said continuously captured pictorial information in said at least one memory
   the recording device being adapted to receive commands containing trigger information from said remote digital device over said wireless link and to initiate storage of captured pictorial information in said recording device when receiving sensing signals that match said trigger information from said at least one sensor or external sensing device.

24. A method of activating a storage operation of pictorial information, including the steps of:
   providing a first wearable digital device having a wireless signaling system;
   providing at least one second device having a recording apparatus adapted to be set to continuous capture of pictorial information, a memory, and a wireless signaling system;
   producing in said first wearable device commands containing trigger information, said commands instructing storage of pictorial information in said second device;

communicating said commands over a wireless link using said wireless signaling system to said second device;

receiving said commands in said at least one second device and in response and according to the instructions, initiating storage of at least a part of said continuously captured pictorial information in a memory of said recording apparatus;

forming in said second device sensor signals from at least one sensing device;

communicating said sensor signals over a wireless link using said wireless signaling system to said first wearable digital device; and issuing in said first wearable digital device based on said sensor signals commands containing said trigger information over said wireless link to initiate storage of pictorial information storage in said at least one second digital device.

25. A method of activating a storage operation of pictorial information, including the steps of:

providing a first wearable digital device having a wireless signaling system;

providing at least one second device having a recording apparatus adapted to be set to continuous capture of pictorial information, a memory, and a wireless signaling system;

producing in said first wearable device commands containing trigger information, said commands instructing storage of pictorial information in said second device;

communicating said commands over a wireless link using said wireless signaling system to said second device;

receiving said commands in said at least one second device and in response and according to the instructions, initiating storage of at least a part of said continuously captured pictorial information in a memory of said recording apparatus;

issuing in said first wearable digital device commands over said wireless link containing trigger information regarding storage of pictorial information storage in said at least one second digital device;

forming in said second device sensor signals from at least one sensing device; and interpreting sensing signals that match said trigger information received from said at least one sensing device as said input signal for initiating storage of pictorial information.

* * * * *